US011270196B2

(12) United States Patent
Sawada et al.

(10) Patent No.: US 11,270,196 B2
(45) Date of Patent: Mar. 8, 2022

(54) MULTI-MODE LOW-PRECISION INNER-PRODUCT COMPUTATION CIRCUITS FOR MASSIVELY PARALLEL NEURAL INFERENCE ENGINE

(71) Applicant: INTERNATIONAL BUSINESS MACHINES CORPORATION, Armonk, NY (US)

(72) Inventors: Jun Sawada, Austin, TX (US); Filipp A. Akopyan, New Windsor, NY (US); Rathinakumar Appuswamy, San Jose, CA (US); John V. Arthur, Mountain View, CA (US); Andrew S. Cassidy, San Jose, CA (US); Pallab Datta, San Jose, CA (US); Steven K. Esser, San Jose, CA (US); Myron D. Flickner, San Jose, CA (US); Dharmendra S. Modha, San Jose, CA (US); Tapan K. Nayak, San Jose, CA (US); Carlos O. Otero, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 351 days.

(21) Appl. No.: 16/653,366

(22) Filed: Oct. 15, 2019

(65) Prior Publication Data

US 2021/0110245 A1    Apr. 15, 2021

(51) Int. Cl.
*G06N 3/063*    (2006.01)
*G06N 3/04*    (2006.01)
(52) U.S. Cl.
CPC ........... *G06N 3/063* (2013.01); *G06N 3/0481* (2013.01)

(58) Field of Classification Search
CPC .............................. G06N 3/063; G06N 3/0481
(Continued)

(56) References Cited

U.S. PATENT DOCUMENTS 5,280,439 A    1/1994  Quek et al.
5,640,261 A    6/1997  Ono
(Continued)

FOREIGN PATENT DOCUMENTS

JP    2001256038 A    9/2001

OTHER PUBLICATIONS

Tsoumainis, et al., "An optimized modified booth recoder for efficient design of the add-multiply operator", IEEE Transactions on Circuit and Systems—I.Regular Papers, vol. 61, No. 4, Apr. 2014 (Year: 2014).*

(Continued)

*Primary Examiner* — Tsu-Chang Lee
(74) *Attorney, Agent, or Firm* — Erik A. Huestis; Stephen J. Kenny; Foley Hoag, LLP

(57) ABSTRACT

Neural inference chips for computing neural activations are provided. In various embodiments, the neural inference chip is adapted to: receive an input activation tensor comprising a plurality of input activations; receive a weight tensor comprising a plurality of weights; Booth recode each of the plurality of weights into a plurality of Booth-coded weights, each Booth coded value having an order; multiply the input activation tensor by the Booth coded weights, yielding a plurality of results for each input activation, each of the plurality of results corresponding to the orders of the Booth-coded weights; for each order of the Booth-coded weights, sum the corresponding results, yielding a plurality of partial sums, one for each order; and compute a neural activation from a sum of the plurality of partial sums.

20 Claims, 18 Drawing Sheets

(58) Field of Classification Search
USPC .......................................................... 706/43
See application file for complete search history.

(56) References Cited

U.S. PATENT DOCUMENTS

| | | |
|---|---|---|
| 5,847,981 A | 12/1998 | Kelley et al. |
| 7,334,011 B2 | 2/2008 | Guevokian et al. |
| 7,587,582 B1 | 9/2009 | Sudharsanan et al. |
| 2019/0056916 A1 | 2/2019 | Varma et al. |
| 2019/0227769 A1* | 7/2019 | Chen ..................... G06F 9/3013 |

OTHER PUBLICATIONS

International Search Report and Written Opinion for International Application No. PCT/EP2020/077802 dated Feb. 2, 2021.

Mallayagari et al., "Optimizing the Modified Booth Recoder for Fused Add-Multiply Operator," SSRG International Journal of VLSI & Signal Processing, 2(2): 1-5 (2015).

Ullah et al., "Factored Radix-8 Systolic Array for Tensor Processing," IEEE, 1-6 (2020).

* cited by examiner $$\begin{array}{r}
A \quad \text{—— 501} \\
* \quad B \quad \text{—— 502} \\
\hline
A*\text{Booth}(B[1{:}{-}1]) \text{—— 503} \\
A*\text{Booth}(B[3{:}1]) \text{—— 504} \\
A*\text{Booth}(B[5{:}3]) \text{—— 505} \\
+ \quad A*\text{Booth}(B[7{:}5]) \text{—— 506} \\
\hline
A*B \quad \text{—— 507}
\end{array}$$

603 — 1111111101101 = 19 * (-1) (2's complement of 00010011, sign extended.)
604 — 00100110 = 19 * 2 * 4 (19 shifted by 3bits)
605 — 000000000 = 19 * 0 * 16
606 — + 00010011 = 19 * 1 * 64 (19 shifted by 6 bits)
607 — 00000101010000101 = 1349

MULTI-MODE LOW-PRECISION INNER-PRODUCT COMPUTATION CIRCUITS FOR MASSIVELY PARALLEL NEURAL INFERENCE ENGINE

This invention was made with Government support under FA8750-18-C-0015 awarded by U.S. Air Force, Office of Scientific Research. The government has certain rights to this invention.

BACKGROUND

Embodiments of the present disclosure relate to neural network processing, and more specifically, to multi-mode low-precision inner-product computation circuits for massively parallel neural inference engines.

BRIEF SUMMARY

According to embodiments of the present disclosure, neural inference chips for computing neural activations are provided. In various embodiments, the neural inference chip is adapted to: receive an input activation tensor comprising a plurality of input activations; receive a weight tensor comprising a plurality of weights; Booth recode each of the plurality of weights into a plurality of Booth-coded weights, each Booth coded value having an order; multiply the input activation tensor by the Booth coded weights, yielding a plurality of results for each input activation, each of the plurality of results corresponding to the orders of the Booth-coded weights; for each order of the Booth-coded weights, sum the corresponding results, yielding a plurality of partial sums, one for each order; and compute a neural activation from a sum of the plurality of partial sums.

In some embodiments, the input activation tensor has a dimension of one. In some embodiments, the weight tensor has a dimension of two.

In some embodiments, computing the neural activation comprises shifting each of the plurality of partial sums according to its corresponding order. In some embodiments, computing the neural activation comprises shifting each of the plurality of partial sums according to a precision of the input activations. In some embodiments, computing the neural activation comprises applying a nonlinear activation function to the sum of the plurality of partial sums. In some embodiments, summing said corresponding results comprises applying a plurality of carry-save adders.

According to embodiments of the present disclosure, neural inference chips for computing neural activations are provided. In various embodiments, the neural inference chip is adapted to: receive an input activation tensor comprising a plurality of input activations; receive a weight tensor comprising a plurality of weights; Booth recode each of the plurality of input activations into a plurality of Booth-coded input activations, each Booth coded value having an order; multiply the weight tensor by the Booth coded input activations, yielding a plurality of results for each weight, each of the plurality of results corresponding to the orders of the Booth-coded input activations; for each order of the Booth-coded input activations, sum the corresponding results, yielding a plurality of partial sums, one for each order; and compute a neural activation from a sum of the plurality of partial sums.

In some embodiments, the input activation tensor has a dimension of one. In some embodiments, the weight tensor has a dimension of two.

In some embodiments, computing the neural activation comprises shifting each of the plurality of partial sums according to its corresponding order. In some embodiments, computing the neural activation comprises shifting each of the plurality of partial sums according to a precision of the input activations. In some embodiments, computing the neural activation comprises applying a nonlinear activation function to the sum of the plurality of partial sums. In some embodiments, summing said corresponding results comprises applying a plurality of carry-save adders.

According to embodiments of the present disclosure, methods of and computer program products for computing neural activations are provided. An input activation tensor comprising a plurality of input activations is received. A weight tensor comprising a plurality of weights is received. Each of the plurality of weights is Booth recoded into a plurality of Booth-coded weights, each Booth coded value having an order. The input activation tensor is multiplied by the Booth coded weights, yielding a plurality of results for each input activation, each of the plurality of results corresponding to the orders of the Booth-coded weights. For each order of the Booth-coded weights, the corresponding results are summed, yielding a plurality of partial sums, one for each order. A neural activation is computed from a sum of the plurality of partial sums.

In some embodiments, the input activation tensor has a dimension of one. In some embodiments, the weight tensor has a dimension of two.

In some embodiments, computing the neural activation comprises shifting each of the plurality of partial sums according to its corresponding order. In some embodiments, computing the neural activation comprises shifting each of the plurality of partial sums according to a precision of the input activations. In some embodiments, computing the neural activation comprises applying a nonlinear activation function to the sum of the plurality of partial sums. In some embodiments, summing said corresponding results comprises applying a plurality of carry-save adders.

According to embodiments of the present disclosure, methods of and computer program products for computing neural activations are provided. An input activation tensor comprising a plurality of input activations is received. A weight tensor comprising a plurality of weights is received. Each of the plurality of input activations is Booth recoded into a plurality of Booth-coded input activations, each Booth coded value having an order. The weight tensor is multiplied by the Booth coded input activations, yielding a plurality of results for each weight, each of the plurality of results corresponding to the orders of the Booth-coded input activations. For each order of the Booth-coded input activations, the corresponding results are summed, yielding a plurality of partial sums, one for each order. A neural activation is computed from a sum of the plurality of partial sums.

In some embodiments, the input activation tensor has a dimension of one. In some embodiments, the weight tensor has a dimension of two.

In some embodiments, computing the neural activation comprises shifting each of the plurality of partial sums according to its corresponding order. In some embodiments, computing the neural activation comprises shifting each of the plurality of partial sums according to a precision of the input activations. In some embodiments, computing the neural activation comprises applying a nonlinear activation function to the sum of the plurality of partial sums. In some embodiments, summing said corresponding results comprises applying a plurality of carry-save adders.

BRIEF DESCRIPTION OF THE SEVERAL VIEWS OF THE DRAWINGS

FIG. 5 illustrates an exemplary Booth recoding multiplier according to embodiments of the present disclosure.

FIG. 6 illustrates an exemplary Booth recoding multiplier according to embodiments of the present disclosure.

FIG. 10 illustrates a multiple precision input data format is illustrated according to embodiments of the present disclosure.

DETAILED DESCRIPTION

Figure 1:
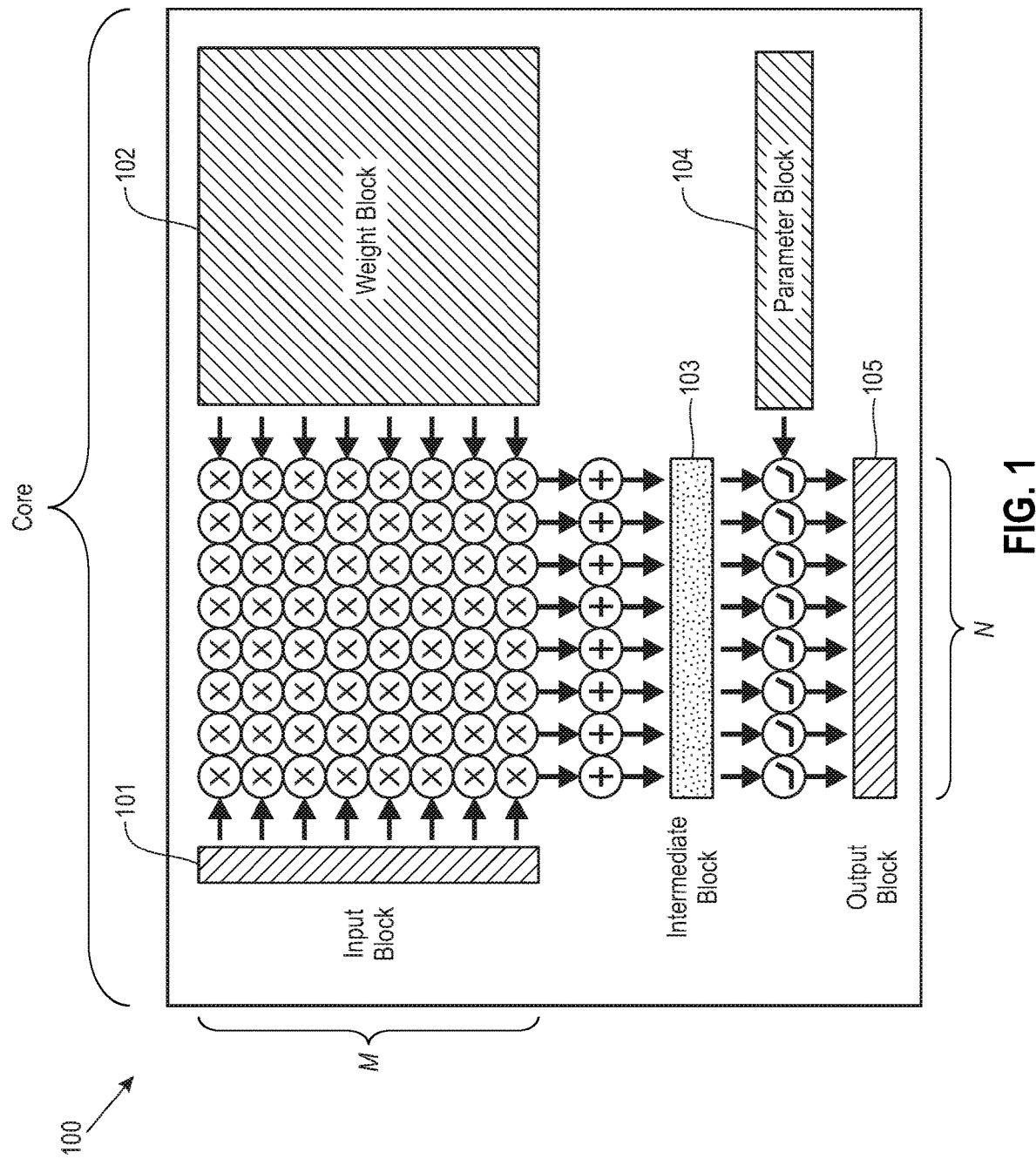
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions σ in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ. In some embodiments, activation function σ requires no additional parameters, in which case the additional dimension is unnecessary. However, in some embodiments, activation function σ requires at least one additional parameter, which appears in dimension o.

An element of a layer's output data tensor Y can be computed as in Equation 1 where the neuron activation function σ is configured by the vector of activation function parameters V[i, j, k, :], and the weighted sum Z[i, j, k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c,] \cdot X[a, b, c] \quad \text{Equation 2}$$

For simplicity of notation, the weighted sum in Equation 2 may be referred to as the output, which is equivalent to using a linear activation function $Y[i, j, k] = \sigma(Z[i, j, k]) = Z[i, j, k]$, with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are parallel structures. Neurons in a given layer receive inputs, X with elements $x_i$ from one or more layers or other inputs. Each neuron computes its state, $y \in Y$ based on the inputs and weights W with elements $w_i$. In various embodiments, the weighed sum of inputs is adjusted by a bias b, and then the result is passed to a nonlinearity $F(\cdot)$. For example, a single neuron activation may be expressed as $y=F(b+\Sigma x_i w_i)$.

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
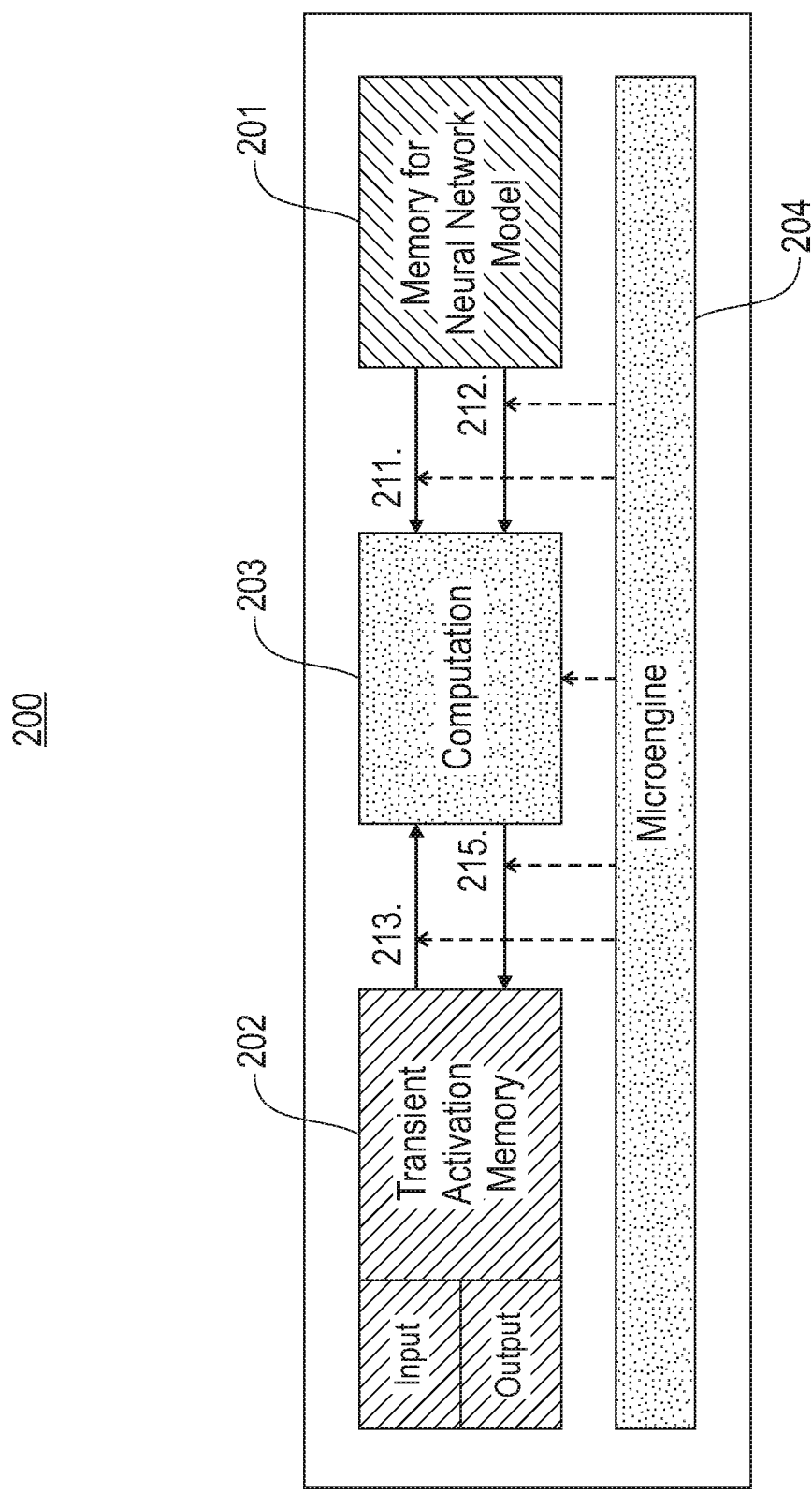
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
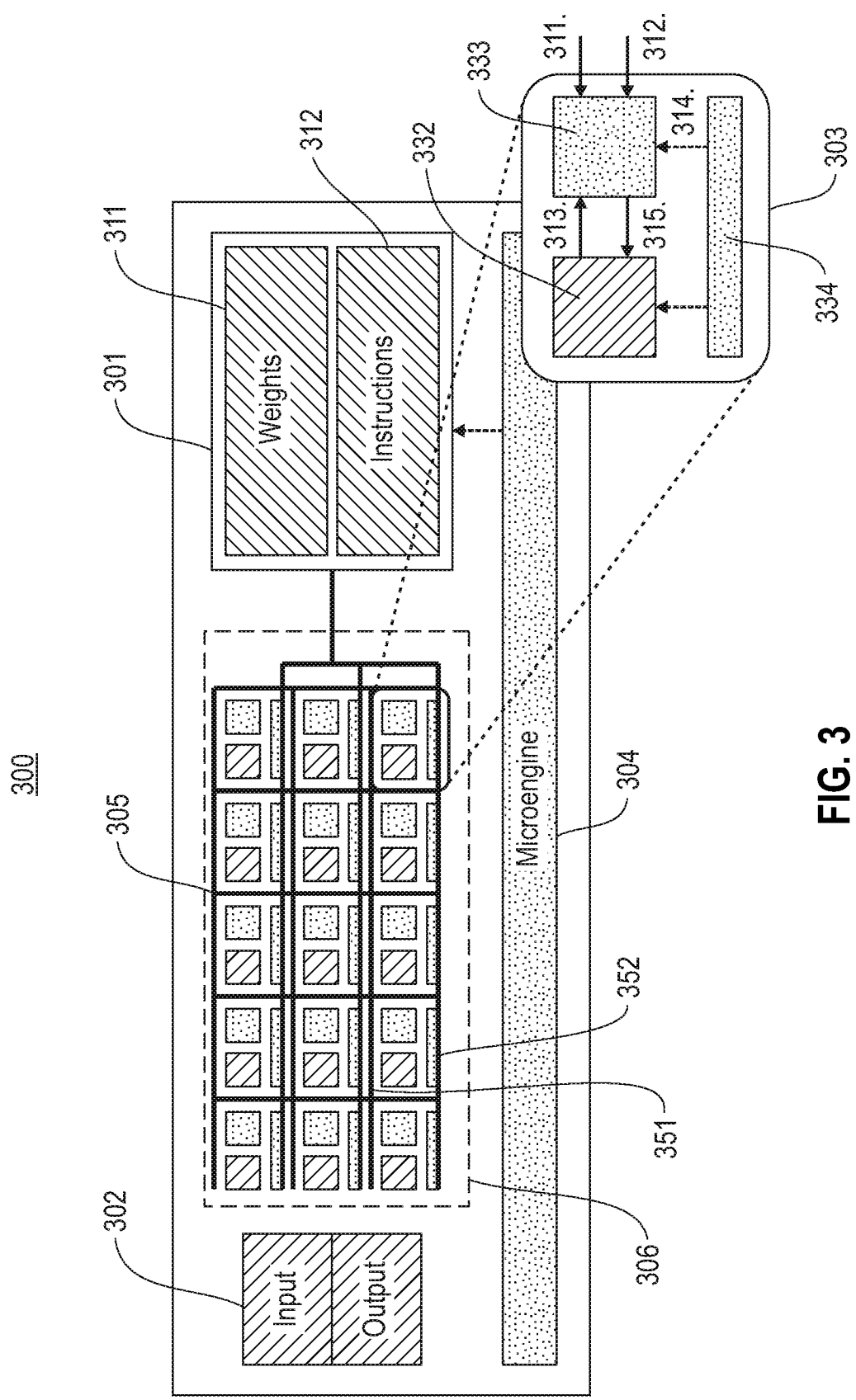
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weight portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the direction of operations is shared between the global microengine (chip microengine) and the local core controller (core microengine). In particular, at 311, compute instructions are loaded from model memory 301 to the neural computation unit 333 on each core 303 by global microengine 304. At 312, parameters (e.g., neural network/synaptic weights) are loaded from model memory 301 to the neural computation unit 333 on each core 303 by global microengine 304. At 313, neural network activation data are loaded from activation local activation memory 332 to neural computation unit 333 on each core 303 by local core controller 334. As noted above, the activations are provided to the neurons of the particular neural network defined by the model, and may originate from the same or another neural computation unit, or from outside the system. At 314, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 315, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) In the distributed case, core microcode is run on the core microengines (e.g., 334). The core microcode includes instruction(s) to execute a full, single tensor operation. For example, a convolution between a weight tensor and a data tensor. In the context of a single core, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

In various embodiments, vector-matrix multipliers are used to accelerate the computation of synaptic integration. As outlined above, an activation vector X is multiplied by weight matrix W. This intermediate result is given as PS=XW. Each column of PS may be computed as $PS_j = \Sigma x_i w_{ij}$. In this formula, activation $x_i$ and weight $w_{ij}$ may be, for example, 2-bit, 4-bit, or 8-bit in a low precision fixed-point computation. In an exemplary implementation, the multiplication $x_i w_{ij}$ is performed and a summation is taken of all the products.

An exemplary multiplier suitable for this computation may be implemented in the following way. Booth recoding is applied to generated partial sums, generating n/2 partial sums for an n-bit multiplier. Partial sums are then compressed by carry-save adders, reducing the number of partial sums from n/2 to 2. A full carry-propagate adder (or its variant) is used to add the final 2 partial sums to the product. In these steps, the carry-propagate adder requires complex circuitry. For a vector-multiply multiplication of a n-element vector X and n×m element matrix W, n×m carry propagate adders are required. To save circuit space, it is desirable to use only one carry propagate adder for each $\Sigma x_i w_{ij}$ calculation. In general, the circuit implementation may be optimized by changing the order of computation in $\Sigma x_i w_{ij}$.

Moreover, it is desirable to modify a vector-matrix multiplier to support multiple precisions, e.g., 2-bit, 4-bit, 8-bit or more precisions. It is also desirable to reuse the circuitry as much as possible between these multiple precisions of computations. In the multiply-first summation-second approach, each multiplier has to support multiple precisions of multiplication. By changing the order of operation of the circuitry, the same data-path can be reused for multiple precisions of operations.

In various embodiments, fixed-point inner-product computations $\Sigma x_i w_{ij}$ are performed by: Booth-Recoded partial sum generation; Partial sum reduction of the Booth-recoded partial sum of the same order; and Summation of all the partial sum to get the final answer.

This way, the value of individual multipliers is not generated. Rather, each multiplier calculation is distributed across the entire inner-product computation. When computing in different precisions, a different amount of shifting on the partial sums is performed at the summation step. Accordingly, a minimum amount of multiple-precision circuitry is necessary.

Figure 4:
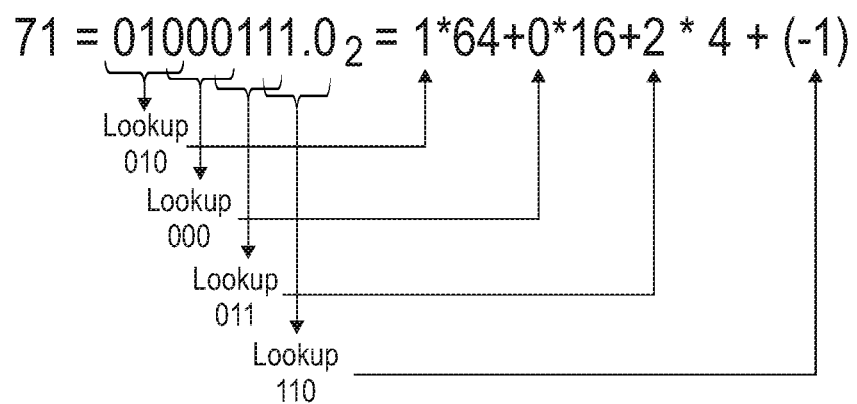
FIG. 4 illustrates an exemplary Booth recoding according to embodiments of the present disclosure.

Referring to FIG. 4, an exemplary Booth recoding is illustrated. Booth recoding may be used by a multiplier to generate partial sums. Values are recoded with a table look up. In this example, Table 1 provides a radix-2 Booth recoding table.

Table 1

| 3-bit combination | |
|---|---|
| 011 | +2 |
| 010 | +1 |
| 001 | +1 |
| 000 | 0 |
| 111 | 0 |
| 110 | −1 |
| 101 | −1 |
| 100 | −2 |

To illustrate the procedure for booth recoding, consider multiplying A with B using radix-4 Booth recoding. First, the Booth recoding table (e.g., Table 1) is checked for overlapping 3-bits of the multiplier B, starting from every other bit. Use bits B[1: −1], B[3:1], B[5:3], etc. B[−1] is an extra bit added to the right of the least significant bit of B and it is 0. The partial sum vector is generated from A depending on the Booth recoding of the corresponding position of B. Partial sum vectors are shifted by two bits for each booth recoding. Thus, the partial sum for $\{B_1, B_0, B_{-1}\}$ starts from bit position 0, but the partial sum for $\{B_3, B_2, B_1\}$ starts from bit position 2. The number of partial sum vectors is compressed down to 2 using carry save adders. Finally, the compressed two partial sum vectors are added to the product using a carry-propagate adder (or its variant).

Referring to FIG. 5, an 8-bit Booth recoding multiplier is illustrated. In this example, multiplication is performed of multiplicand A (501) and multiplier B (502). It is assumed B is 8 bit binary B[7:0]. B[−1]=0 is added to the right of B[0]. To compute partial sums 503 ... 506, the Booth table lookup is taken: Booth(B[i+1:i−1]) for i=0, 2, 4, 6. If Booth(B[i+1:i−1])=2, then A*Booth(B[i+1:i−1])=A<<1. If Booth(B[i+1:i−1])=1, then A*Booth(B[i+1:i−1])=A. If Booth(B[i+1: −1])=0, then A*Booth(B[i+1: −1])=0. If Booth(B[i+1:i−1])=−1, then A*Booth(B[i+1:i−1])=−A. If Booth(B[i+1:i−1])=−2, then A*Booth(B[i+1:i−1])=−A<<1. Partial sum A*Booth(B[i+1:i−1]) is shifted to the left by i bits before adding.

For example, partial sum 503 for i=0 is aligned to the position of A and B. Partial sum 504, 505, and 506 are shifted to the left by 2 bits, 4 bits, and 6 bits, respectively. These partial sums 503-506 thus have staggered position, and are said to be of different order.

In each case, partial sum A*Booth(B[i+1:i−1])=A can be computed from the value A by either selecting 0, A or −A, and optionally shifting to the left by 1 bit. Finally, adding four partial sums 503 ... 506 will produce the product A*B 507.

Referring to FIG. 6, a Booth recoding multiplier example is illustrated. This example shows the binary calculation of 19*71. Since the Booth recoded value from the bits 110 at [B1:B−1] is −1 according to Table 1, the first partial sum 603 is 111111111101101, which is a 2's complement of multiplicand 00010011 (601) with sign extension. The second partial sum 000100110 (604) is the multiplicand shifted to the left by one-bit, as the second Booth recoding of 011 at [B3:B1] is 2. The third partial sum 605 is 000000000 as the third Booth recoding value of 000 at [B5:B3] is 0. The last partial sum 606 is 000010011, since the Booth recoding of 010 at [B7:B5] is 1. The partial sums are positioned 2 bits apart: partial sum 604 is positioned 2 bits left of partial sum 603; partial sum 605 is 4 bits left of partial sum 603; and partial sum 606 is positioned 6 bits left of partial sum 603. Finally, adding all partial sums produces the correct product 607, 19*71=1349 in binary format.

Figure 7:
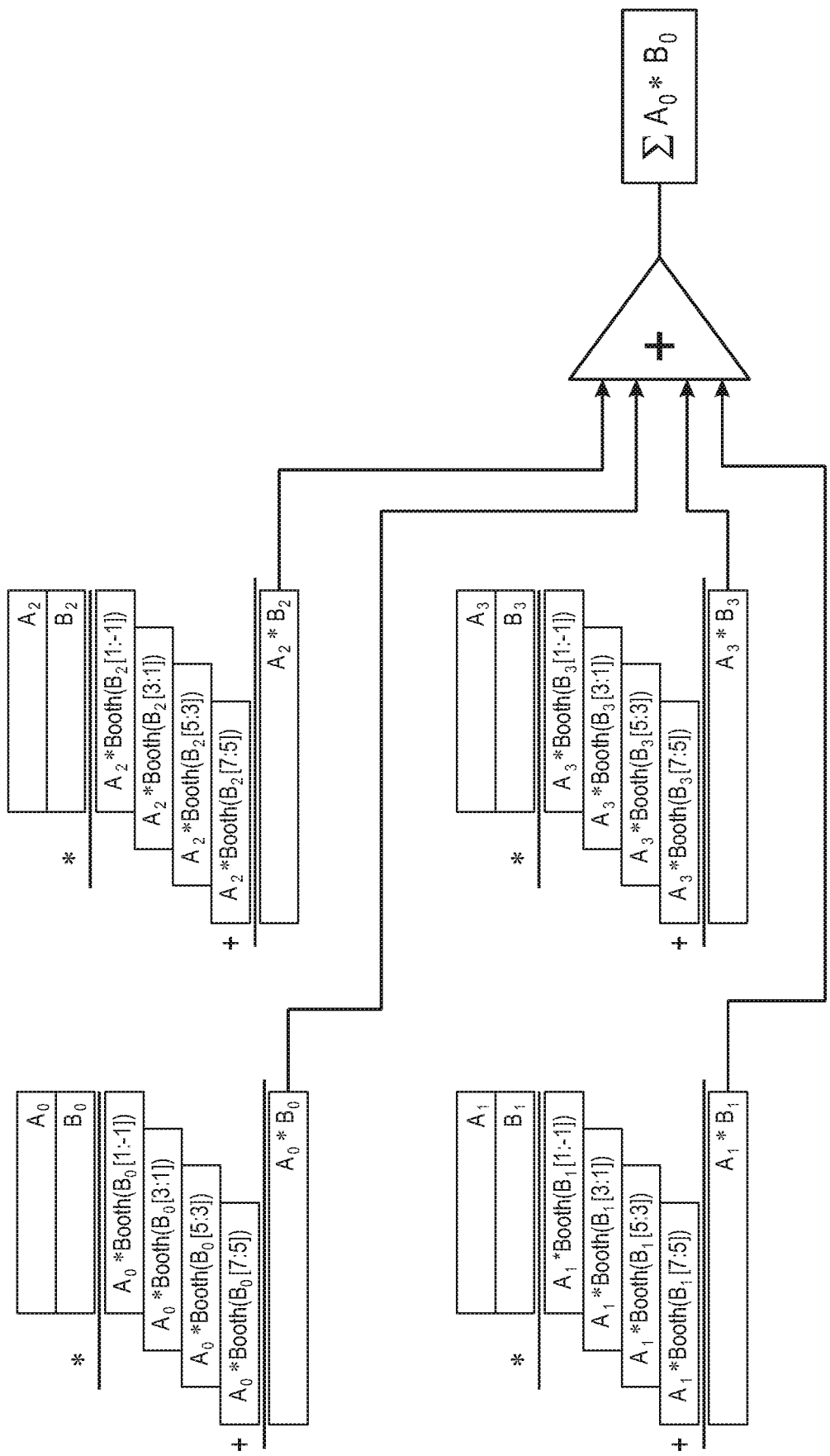
FIG. 7 illustrates an exemplary method for computing an inner product according to embodiments of the present disclosure.

Referring to FIG. 7, an exemplary method for computing an inner product is illustrated. In this example, the multiplier computes $A_i*B_i$ for all i, and then adds them together to yield $\Sigma A_i*B_i$. In this way, the inner-product is obtained by first computing the multiply results of each $A_i*B_i$, and then adding them together.

Figure 8:
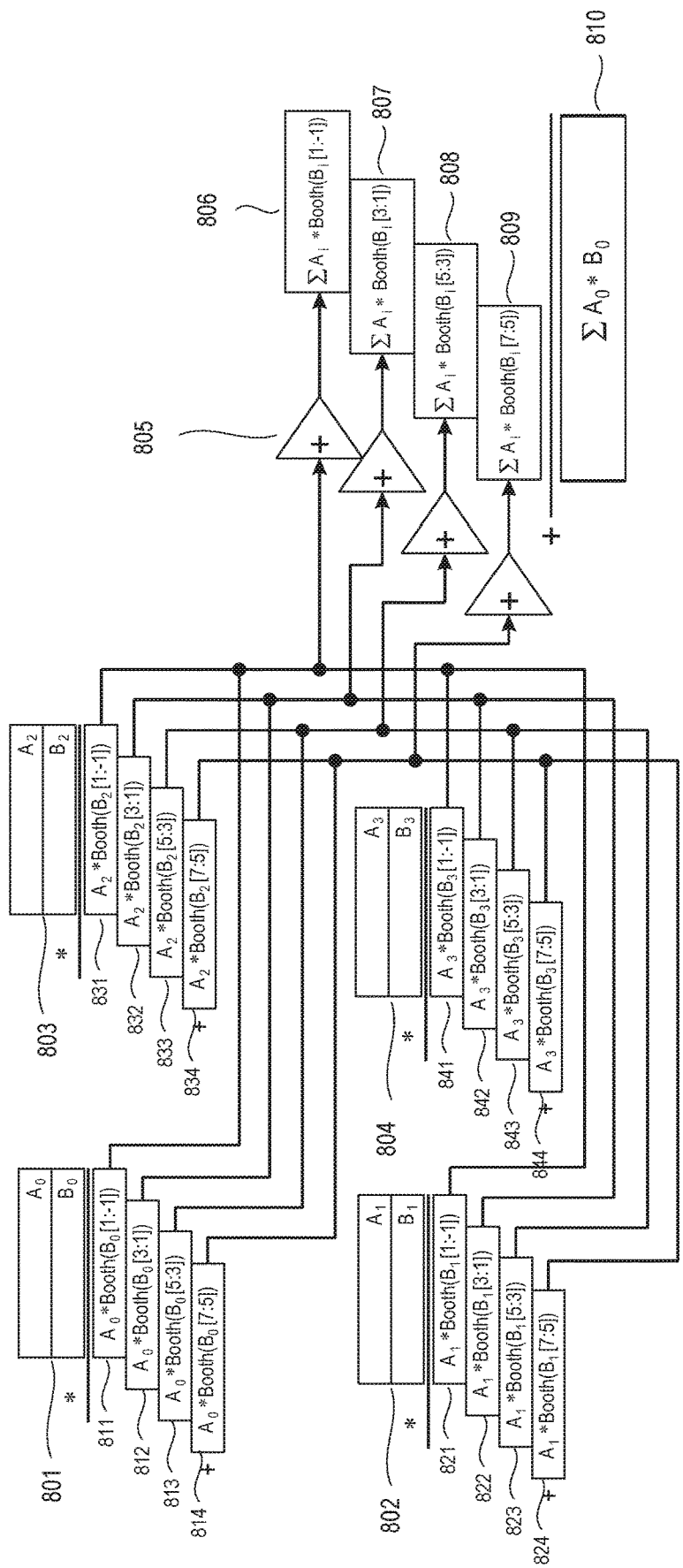
FIG. 8 illustrates an exemplary method for computing an inner product according to embodiments of the present disclosure.

Referring to FIG. 8, an exemplary method for computing an inner product is illustrated. In this example, instead of calculating the product of individual $A_i*B_i$, the summation of the partial sum of the same order are computed, and then they are added together. In particular, for each $A_i*B_i$ 801 . . . 804, partial sums 811 . . . 814, 821 . . . 824, 831 . . . 834, and 841 . . . 844 are computed as described above. In this example, four partial sums are computed, corresponding to $B_i[1:-1]$, $B_i[3:1]$, $B_i[5:3]$, $B_i[7:5]$. Partial sums of the same order are summed separately by adders 805, yielding sums 806 . . . 809. For example, partial sums 811, 821, 831, and 841 are of the same order, and are added together by adder 805 to generate sum 806. Separately, partial sums 812, 822, 832 and 842 are of the same order and are added to generate sum 807. Partial sums 813, 823, 833, and 843 are added to yield sum 808. Partial sums 814, 824, 834, and 844 are added to yield sum 809. Finally, sums 806 . . . 809 are shifted two bits apart, and added together to yield final result $\Sigma A_i*B_i$ 810.

Figure 9:
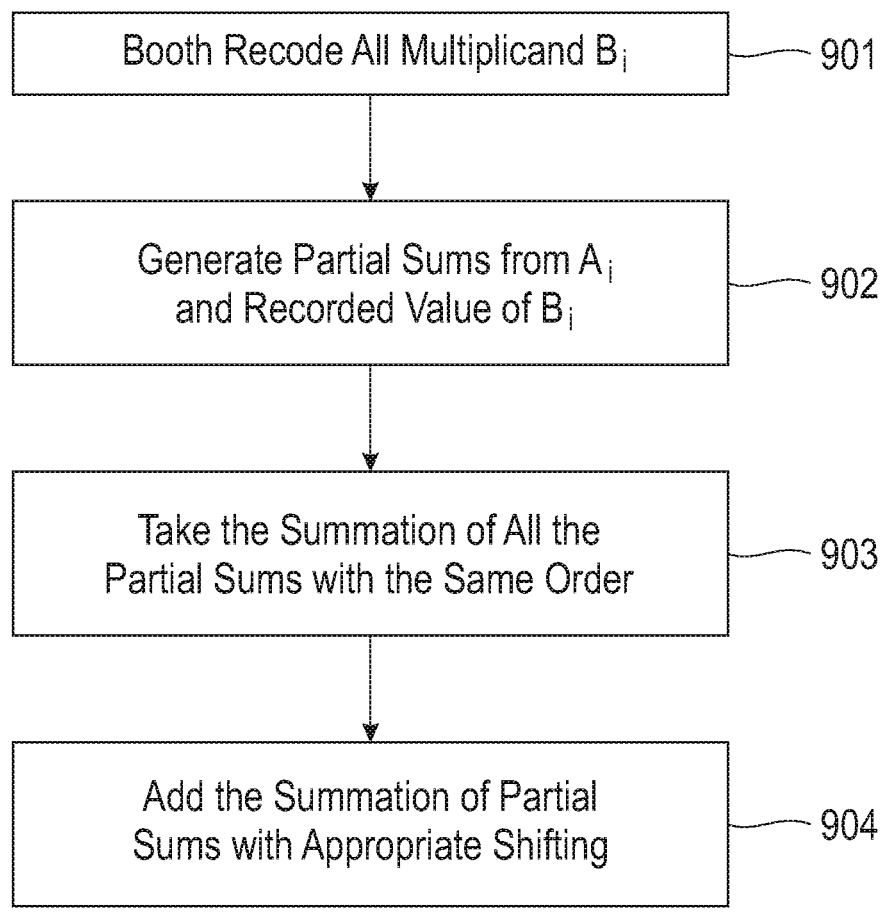
FIG. 9 illustrates a method for computing an inner product according to embodiments of the present disclosure.

Referring to FIG. 9, a method of computing an inner product is illustrated. In particular, as shown, the inner product $\Sigma A_0*B_0$ is computed using the summation of partial sums of the same order. At 901, all multiplicand $B_i$ are Booth recoded. At 902, partial sums are generated from $A_i$ and the recoded value of B. At 903, the summation of all the partial sums with the same order from different multipliers are calculated separately. At 904, the summation of partial sums is added with appropriate shifting.

In this approach, all partial sums of the same order are aligned, and the early summation process is more efficient. For low precision neural vector-matrix multiplication with a large vector and a matrix, each multiplication has a small number of partial sums of different orders. However, there are a large number of partial sums of the same order from different multiplications. Accordingly, the reduction of many partial sums will lead to a more efficient implementation. For example, a 32×32 matrix with 8-bit precision has 4 partial sums for each multiplication. However, each inner product computation needs to add up 32 partial sums of the same order.

Another advantage of this approach is that the computation circuit for multiple precision mode can be shared. Referring to FIG. 10, a multiple precision input data format is illustrated. In such embodiments, the same vector or matrix is interpreted in different precision. For example, 16-bit data can be used as 2-element 8-bit vector, 4-element 4-bit vector, or 8-element 2-bit-vector. As shown in FIG. 10, 8 bits may be used to provide 8-bit mode activations (1001), 4-bit mode activations (1002), or 2-bit mode activations (1003). Likewise, 8 bits may be used to provide 8-bit mode weights (1004), 4-bit mode weights (1005), or 2-bit mode weights (1006). This shows how 8-bit data may be interpreted as a 8-bit singleton, 4-bit double, or 2-bit quadruple.

The inner-product circuit described above may be used to support multiple precision inner-product generation. The Booth recoding and the partial sum generation circuit needs to modify the input data slightly. No modification is necessary for the circuit to add all the partial sum of the same order. The final summation circuit needs to shift the summation of partial sums of the same order with a different amount and then add them together.

Figure 11A:
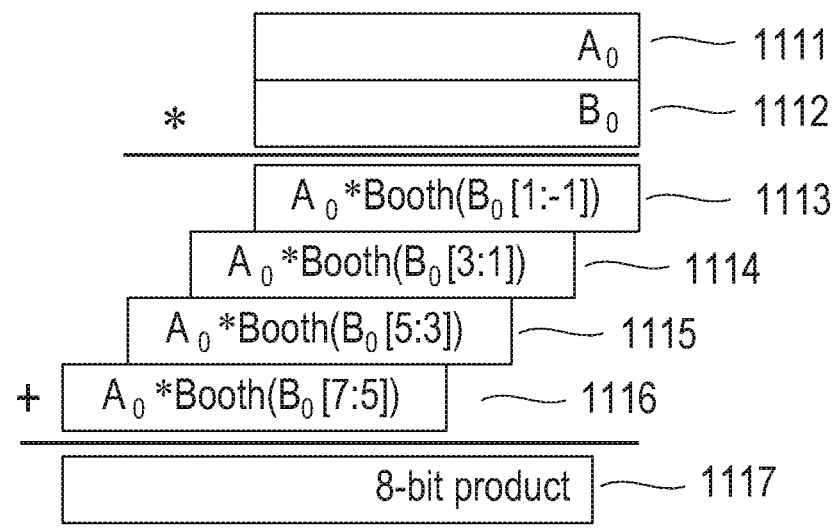
FIGS. 11A-C illustrate partial sum generation in various precisions according to embodiments of the present disclosure.
Figure 11B:
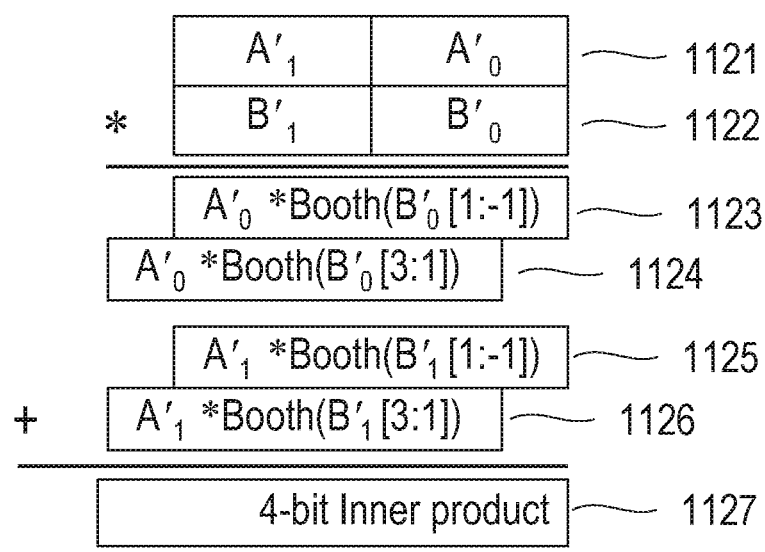
Figure 11C:
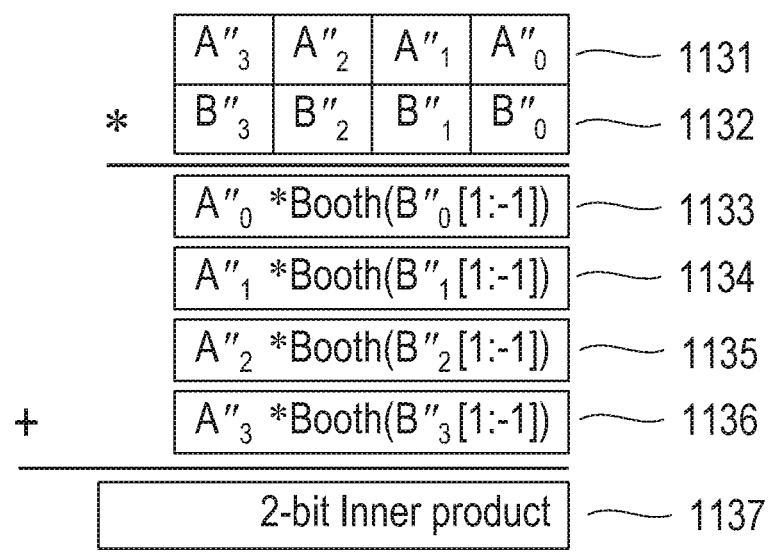

Referring to FIGS. 11A-C, partial sum generation is compared for 8-bit (FIG. 11A), 4-bit (FIG. 11B), and 2-bit (FIG. 11C) mode. This shows how partial sums are generated. Compared to 8-bit mode, multiplicand input to the partial sum generators are 4-bit $A'_i$ or 2-bit $A''_i$. Multiplicand input to the Booth encoders are nearly identical bits (because $B_0[7:5]=B'_1[3:1]$ and $B_0[7:6]=B''_3[1:0]$). Only $B'_i[-1]$ and $B''_i[-1]$ have to be assumed to be 0.

FIG. 11A shows how an 8-bit multiplier calculates an 8-bit product 1117. Partial sums 1113 . . . 1116 for the 8-bit multiplier is generated by first computing the Booth recoding of $B_0$ and then by choosing 0, $A_0$, or $-A_0$ with a potential shift.

In FIG. 11B, 2-way 4-bit multipliers generate $A'_0*B'_0+A'_1*B'_1$. First $B'_0$ is Booth recoded and used to generate partial sums 1123 . . . 1124. These partial sums need to be generated by selecting either 0, $A'_0$, or $-A'_0$, with a potential shift to left by one bit. Similarly, $B'_1$ will be Booth recoded and used to generate partial sums 1125 . . . 1126, by selecting either 0, $A'_1$, or $-A'_1$, with a potential shift by one bit. Unlike the 8-bit multiplier, partial sums 1123 . . . 1124 from $A'_0$ and $B'_0$ are aligned with partial sums 1125 . . . 1126 generated from $A'_1$ and $B'_1$, because they are both generated from the Booth recoding at the position of 1 to −1, which is $B'_0[1:-1]$ and $B'_1[1:-1]$. Finally, all partial sums 1123 . . . 1126 are added together to generate a 4-bit inner product 1127.

In FIG. 11C, 4-way 2-bit multipliers compute inner product $A''_0*B''_0+A''_1*B''_1+A''_2*B''_2+A''_3*B''_3$. Partial sum 1133 is generated from $A''_0$ and $B''_0$, by first Booth recoding $B''_0$, and selecting either 0, $A''_0$, or $-A''_0$. Similarly, partial sum 1134 is generated from $A''_1$ and $B''_1$, partial sum 1135 is generated from $A''_2$ and $B''_2$, and partial sum 1136 is generated from $A''_3$ and $B''_3$. All partial sums 1133 . . . 1136 are aligned, as they are generated from Booth recording value of the same bit positions. Partial sums 1133 . . . 1136 are added together to generate 2-bit inner product 1137.

Compared to 8-bit mode, multiplicand input to the partial sum generators are 4-bit $A'_i$ or 2-bit $A''_i$. Multiplicand input to the Booth encoders are nearly identical bits (because $B_0[7:5]=B'_1[3:1]$ and $B_0[7:6]=B''_3[1:0]$). Only $B'_i[-1]$ and $B''_i[-1]$ have to be assumed to be 0. The Booth recoding logic can be shared, as can the logic to select and shift the multiplicands.

Figure 12:
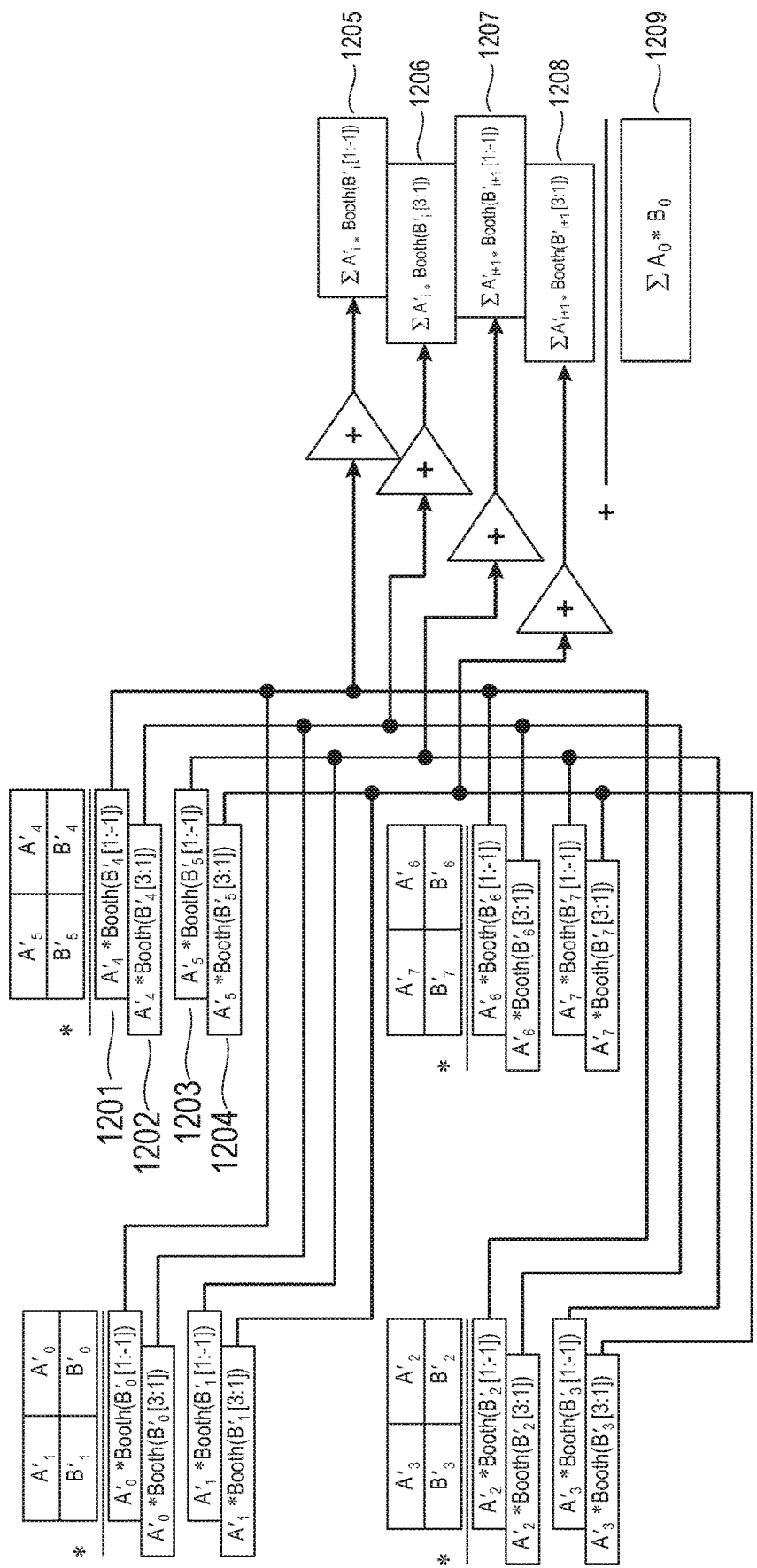
FIG. 12 illustrates a method for computing a 4-bit inner product according to embodiments of the present disclosure.

Referring to FIG. 12, a method for computing a 4-bit inner product is illustrated. In this embodiments, the same approach is adopted to add the partial sums first. Here, the partial sum summation circuits are the same as the 8-bit inner-product computation as shown in FIG. 8. In particular, the first partial sums (e.g., 1201) from each multiplier are collected to compute sum 1205, using the circuit as described for 8-bit mode. Likewise, the second partial sums (e.g., 1202) are added to generate sum 1206, the third partial sums (e.g., 1203) are added to generate sum 1207, and the forth partial sums (e.g., 1204) are added to generate sum 1208. To accommodate the 4-bit mode calculation, a different shift amount is applied to each of sums 1205 . . . 1208 before the final summation, yielding result 1209.

For each partial sum computation, the first partial sum 1201 and second partial sum 1202 are of different orders, thus partial sum 1202 is shifted to the left by 2 bits compared to partial sum 1201. However, the third partial sum 1203 has the same order as the partial sum 1201, and these two partial sums are aligned before the final addition. Similarly, the forth partial sum 1204 is aligned to the second partial sum 1202 but it is shifted to left by 2 bits compared to partial sum 1203. Sum 1206 is shifted to the left by 2 bits compared to the sum of partial sum 1205. However, the third sum 1207 has the same order as sum 1205, and these two sums are aligned before the final addition. Similarly, the fourth sum 1208 is aligned to the second sum 1206 but it is shifted to the left by 2 bits compared to sum 1207. Shifting control for the 4-bit mode is different from the 8-bit mode, but it needs to be implemented only once before the final addition for computing result 1209, rather than at each multiplier.

Figure 13:
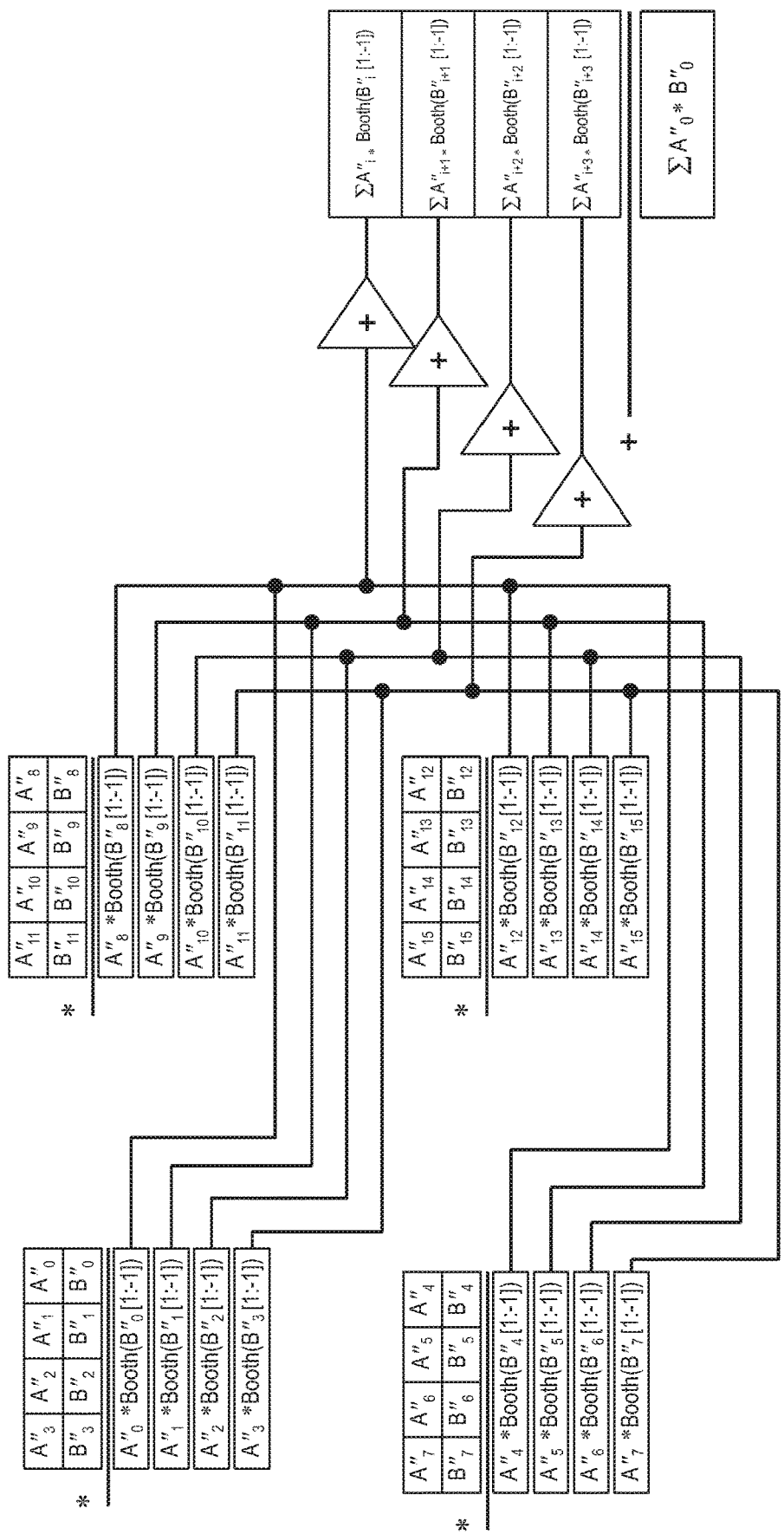
FIG. 13 illustrates a method for computing a 4-bit inner product according to embodiments of the present disclosure.

Referring to FIG. 13, a method for computing a 2-bit inner product is illustrated. Similar to the 4-bit inner product computation of FIG. 12, 2-bit computation uses the same data path as 8-bit mode (as in FIG. 8) to add the partial sums together. However, the final summation is obtained by adding the sum of partial sums without any shifting.

By taking the approach of adding the partial sums of the same order together first, the data path for multiple precisions can be shared, for example providing 8-bit, 4-bit, and 2-bit modes. The Booth recoder and the partial sum generator takes slightly modified inputs as between the various precision configurations. The summation circuits of partial sums of the same order are identical. The final summation needs to be done with a different amount of shifting depending on the precision. This leads to more compact design than alternatives. As compared to an 8-bit configuration, the 4-bit mode gets twice the computation per cycle in terms of multiply-accumulate operations, and 2-bit mode gets 4 times as many multiply-accumulate operations.

Figure 14:
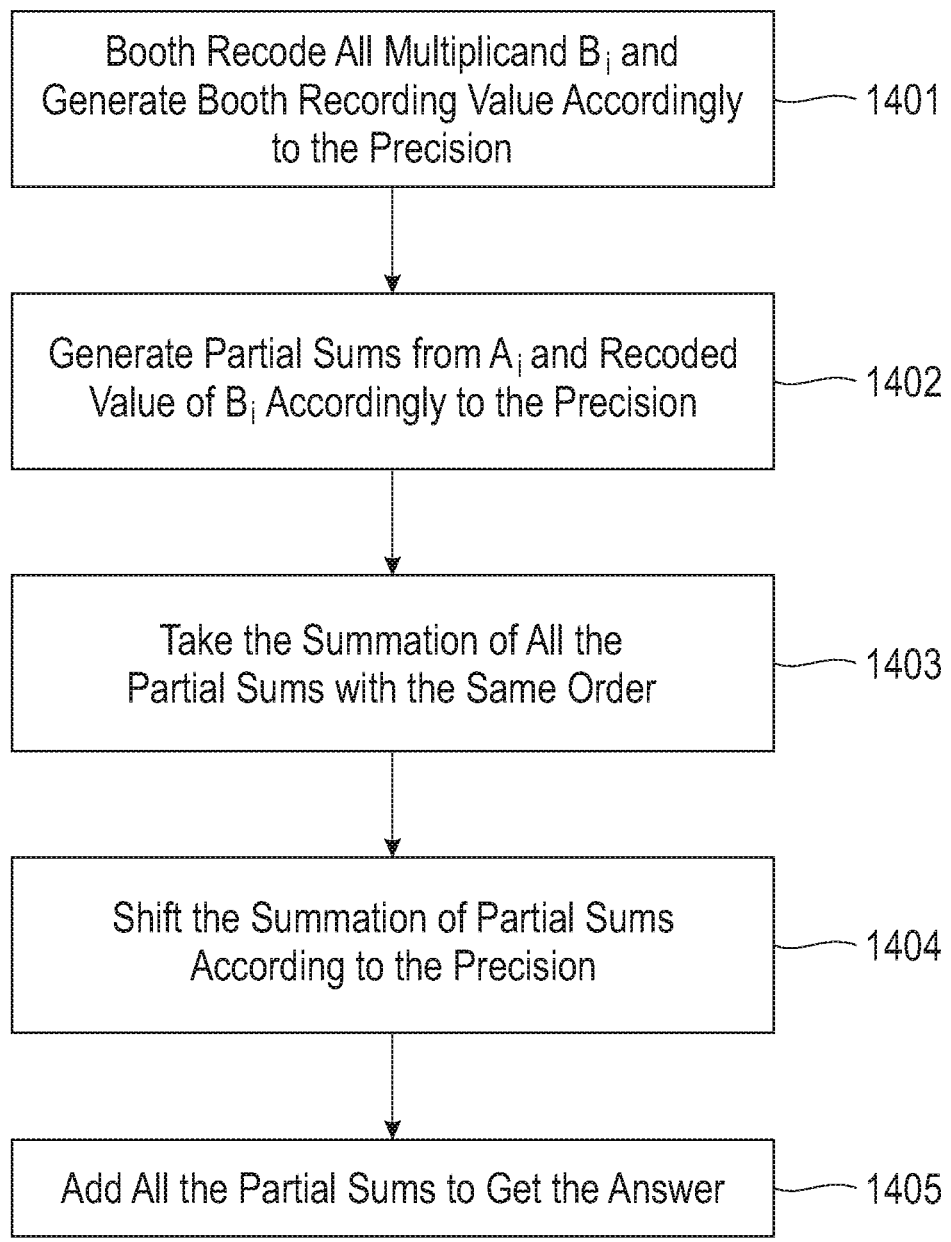
FIG. 14 illustrates a variable precision method of computing an inner product according to embodiments of the present disclosure.

Referring to FIG. 14, a method of computing the inner product of variable precision is illustrated using the summation of partial sums of the same order. At 1401, all multiplicand $B_i$ are Booth recoded. At 1402, partial sums are generated from $A_i$ and the recoded value of $B_i$. At 1403, the summation of all the partial sums with the same order is taken. At 1404, the summation of partial sums is shifted according to their precision. At 1405, the partial sums are added to arrive at a result.

Figure 15:
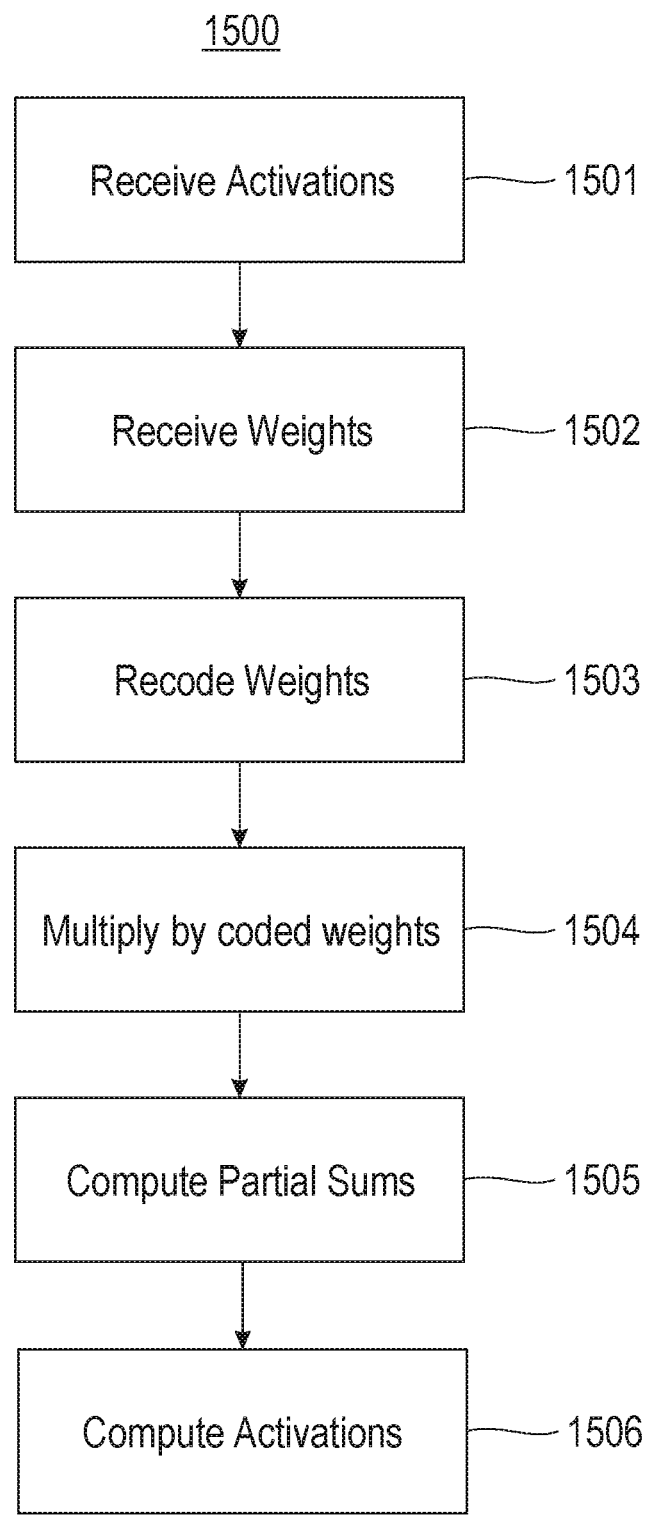
FIG. 15 illustrates a method for computing neural activations according to embodiments of the present disclosure.

Referring to FIG. 15, a method for computing neural activations is illustrated. At 1501, an input activation tensor comprising a plurality of input activations is received. At 1502, a weight tensor comprising a plurality of weights is received. At 1503, each of the plurality of weights is Booth recoded into a plurality of Booth-coded weights, each Booth coded value having an order. At 1504, the input activation tensor is multiplied by the Booth coded weights, yielding a plurality of results for each input activation, each of the plurality of results corresponding to the orders of the Booth-coded weights. At 1505, for each order of the Booth-coded weights, the corresponding results are summed, yielding a plurality of partial sums, one for each order. At 1506, a neural activation is computed from a sum of the plurality of partial sums.

As described above, various embodiments of the present disclosure include a chip for computing the inner product of two vectors by Booth recoding each element of the multiplying vector. Partial sums are generated using the elements of the multiplicand vector and recoded multiplier value. All the partial sums of the same order are added. The summation of the partial sums of the same order are added with shifting. In some embodiments, the partial sum addition is performed using carry-save adder trees. In various embodiments, the multiple instances of the vector multipliers are combined to form vector-matrix multiplier. In various embodiments, multiple instances are combined to form matrix-matrix multiplier.

In various embodiments, multiple precisions are supported by first Booth recoding elements of multiplying vector according to the precision. The partial sums may then be generated according to the precision. All the partial sums of the same order are added. The sum of the partial sums is shifted according to the precision, and they are then added together.

Figure 16:
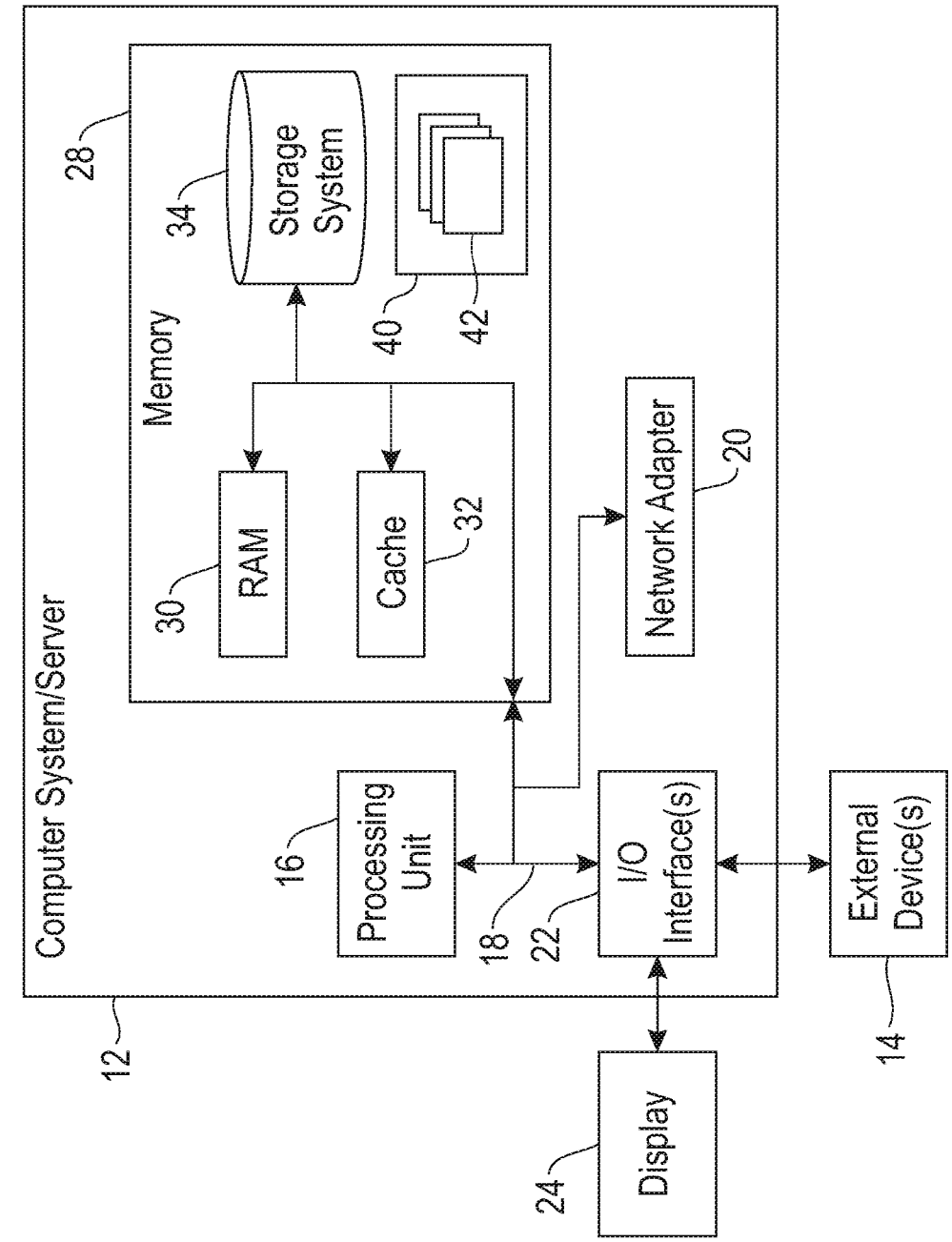
FIG. 16 depicts a computing node according to an embodiment of the present disclosure.

Referring now to FIG. 16, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for computing neural activations, the computer program product comprising a computer readable storage medium having program instructions embodied therewith, the program instructions executable by a neural inference chip to cause the neural inference chip to perform a method comprising:
   receiving an input activation tensor comprising a plurality of input activations, the input activation tensor representing an image, each of the plurality of input activations corresponding to a value at a location in the image;
   receiving a weight tensor comprising a plurality of weights;
   Booth recoding each of the plurality of weights into a plurality of Booth-coded weights, each Booth coded value having an order;
   multiplying the input activation tensor by the Booth coded weights, yielding a plurality of results for each input activation, each of the plurality of results corresponding to the orders of the Booth-coded weights;
   for each order of the Booth-coded weights, summing the corresponding results, yielding a plurality of partial sums, one for each order; and
   computing a neural activation from a sum of the plurality of partial sums.

2. The computer program product of claim 1, wherein the input activation tensor has a dimension of one.

3. The computer program product of claim 1, wherein the weight tensor has a dimension of two.

4. The computer program product of claim 1, wherein computing the neural activation comprises shifting each of the plurality of partial sums according to its corresponding order.

5. The computer program product of claim 1, wherein computing the neural activation comprises shifting each of the plurality of partial sums according to a precision of the input activations.

6. The computer program product of claim 1, wherein computing the neural activation comprises applying a non-linear activation function to the sum of the plurality of partial sums.

7. The computer program product of claim 1, wherein summing said corresponding results comprises applying a plurality of carry-save adders.

8. A computer program product for computing neural activations, the computer program product comprising a computer readable storage medium having program instructions embodied therewith, the program instructions executable by a neural inference chip to cause the neural inference chip to perform a method comprising:
   receiving an input activation tensor comprising a plurality of input activations, the input activation tensor representing an image, each of the plurality of input activations corresponding to a value at a location in the image;
   receiving a weight tensor comprising a plurality of weights;
   Booth recoding each of the plurality of input activations into a plurality of Booth-coded input activations, each Booth coded value having an order;
   multiplying the weight tensor by the Booth coded input activations, yielding a plurality of results for each weight, each of the plurality of results corresponding to the orders of the Booth-coded input activations;
   for each order of the Booth-coded input activations, summing the corresponding results, yielding a plurality of partial sums, one for each order; and
   computing a neural activation from a sum of the plurality of partial sums.

9. The computer program product of claim 8, wherein the input activation tensor has a dimension of one.

10. The computer program product of claim 8, wherein the weight tensor has a dimension of two.

11. The computer program product of claim 8, wherein computing the neural activation comprises shifting each of the plurality of partial sums according to its corresponding order.

12. The computer program product of claim 8, wherein computing the neural activation comprises shifting each of the plurality of partial sums according to a precision of the input activations.

13. The computer program product of claim 8, wherein computing the neural activation comprises applying a non-linear activation function to the sum of the plurality of partial sums.

14. The computer program product of claim 8, wherein summing said corresponding results comprises applying a plurality of carry-save adders.

15. A neural inference chip for computing neural activations, the neural inference chip adapted to:
    receive an input activation tensor comprising a plurality of input activations, the input activation tensor representing an image, each of the plurality of input activations corresponding to a value at a location in the image;
    receive a weight tensor comprising a plurality of weights;
    Booth recode each of the plurality of weights into a plurality of Booth-coded weights, each Booth coded value having an order;
    multiply the input activation tensor by the Booth coded weights, yielding a plurality of results for each input activation, each of the plurality of results corresponding to the orders of the Booth-coded weights;
    for each order of the Booth-coded weights, sum the corresponding results, yielding a plurality of partial sums, one for each order;
    compute a neural activation from a sum of the plurality of partial sums.

16. The neural inference chip of claim 15, wherein computing the neural activation comprises shifting each of the plurality of partial sums according to its corresponding order.

17. The neural inference chip of claim 15, wherein computing the neural activation comprises shifting each of the plurality of partial sums according to a precision of the input activations.

18. The neural inference chip of claim 15, wherein computing the neural activation comprises applying a non-linear activation function to the sum of the plurality of partial sums.

19. The neural inference chip of claim 15, wherein summing said corresponding results comprises applying a plurality of carry-save adders.

20. A neural inference chip for computing neural activations, the neural inference chip adapted to:
    receive an input activation tensor comprising a plurality of input activations, the input activation tensor representing an image, each of the plurality of input activations corresponding to a value at a location in the image;
    receive a weight tensor comprising a plurality of weights;
    Booth recode each of the plurality of input activations into a plurality of Booth-coded input activations, each Booth coded value having an order;
    multiply the weight tensor by the Booth coded input activations, yielding a plurality of results for each weight, each of the plurality of results corresponding to the orders of the Booth-coded input activations;
    for each order of the Booth-coded input activations, sum the corresponding results, yielding a plurality of partial sums, one for each order;
    compute a neural activation from a sum of the plurality of partial sums.

* * * * *